United States Patent Office 3,362,998
Patented Jan. 9, 1968

3,362,998
PROCESS FOR THE MANUFACTURE OF UN-
SATURATED ALDEHYDES FROM OLEFINS
James L. Callahan, Bedford, and Joseph J. Szabo, Chagrin Falls, Ohio, and Berthold Gertisser, New York, N.Y., assignors to The Standard Oil Company, Cleveland, Ohio, a corporation of Ohio
No Drawing. Original application Aug. 19, 1964, Ser. No. 395,978, now Patent No. 3,280,166, dated Oct. 18, 1966. Divided and this application Sept. 2, 1965, Ser. No. 498,177
7 Claims. (Cl. 260—604)

ABSTRACT OF THE DISCLOSURE

A process for the manufacture of unsaturated aldehydes from olefins is provided wherein a mixture of the olefin and oxygen in a molar ratio oxygen to olefin within the range from about 5:1 to about 0.5:1 is contacted in the vapor phase at a temperature within the range from about 500 to about 1000° F. at which aldehyde formation proceeds with a catalyst composed of oxides of bismuth and molybdenum as the essential catalytic ingredients, promoted by a mixture of oxides of barium and silicon. The bismuth oxide is present in the catalyst in an amount to furnish a bismuth to molybdenum Bi:Mo atomic ratio of above 1:3. The mixture of oxides of barium and silicon is present in the catalyst in an amount of about 1 to about 5%, calculated as barium, and about 1 to about 10%, calculated as silicon. If desired, the catalyst can also include phosphorus in an amount up to about 5% by weight.

This application is a division of Serial No. 395,978, filed August 19, 1964, now Patent No. 3,280,166, dated October 18, 1966.

This invention relates to the catalytic oxidation of olefins to oxygenated hydrocarbons such as propylene to acrolein, using an improved oxidation catalyst consisting essentially of oxides of the elements bismuth and molybdenum, and optionally, phosphorus, promoted by oxides of barium and silicon.

The Callahan, Foreman and Veatch U.S. Patent No. 2,941,007 describes the oxidation of an olefin such as propylene and the various butenes with oxygen and a solid catalyst composed of the oxides of bismuth, molybdenum and silicon, and optionally, phosphorus. This catalyst selectively converts propylene to acrolein, isobutylene to methacrolein, $\alpha$- and $\beta$-butylene to methyl vinyl ketone and to butadiene, etc. High yields are obtainable, although in the case of the butenes, careful control of reaction conditions may be required in order to direct the reaction in favor of either methyl vinyl ketone or butadiene, depending upon which of these alternative products is desired.

The Idol, Jr., Patent No. 2,904,580, employs the same catalyst to convert propylene, ammonia and oxygen to acrylonitrile, at approximately atmospheric pressures and elevated temperatures. Excellent conversions, usually in the range of 40 to 80%, nitrogen basis, of useful products are obtainable.

I. THE CATALYST

In accordance with the instant invention, the catalytic activity of such bismuth oxide-molybdenum oxide catalysts is greatly enhanced or promoted by the combination therewith of a mixture of barium and silicon in the form of their oxides, referred to hereinafter as promoters. The promoters in accordance with the invention are best applied by impregnation or surface coating of the catalyst, after its formation in accordance with the procedure described in Serial No. 851,919, the disclosure of which is hereby incorporated by reference. Further, in accordance with the invention, it has been determined that phosphorus oxide can also be present as a supplemental oxide.

The proportions of barium oxide and silicon oxide, with of without phosphorus oxide and/or manganese oxide, are important in obtaining the optimum enhanced activity. The barium oxide concentration, calculated as barium, should be within the range from about 1 to about 5% by weight; and the amount of silicon oxide, calculated as silicon, should be within the range from about 1 to about 10% by weight, although more than 10% can be used, if desired.

While the catalyst of this invention may be employed without any support, it is desirable to combine it with a support. A preferred support is silica because the silica improves the catalytic activity of the catalyst. The silica may be present in any amount but it is preferred that the catalyst contain between about 25 to 75% by weight of silica. Many other materials such as Alundum, silicon carbide, alumina-silica, alumina, titania and other chemically inert materials may be employed as a support which will withstand the conditions of the process.

The catalyst may comprise phosphorus, also present in the form of the oxide. Phosphorus will affect, to some extent, the catalytic properties of the composition, but the presence or absence of phosphorus has no appreciable effect on the physical properties of the catalyst. Thus, the composition can include from 0%, and preferably from at least 0.1%, up to about 5% by weight of phosphorus oxide, calculated as phosphorus.

The promotor is incorporated with the catalyst base by impregnation thereof, using an aqueous solution, dispersion, or suspension of a barium compound and of a silicon compound, either the oxide, or a compound thermally decomposable in situ to the corresponding barium oxide or silicon oxide, respectively, without formation of other deleterious metal oxide residue, for instance, barium acetate, fluosilicic acid, barium bromide, barium chloride, barium nitrate, barium peroxide, barium persulfate, barium propionate, ammonium silicofluoride, sodium silicate, potassium silicate, hydrous barium silicate, silicic acids, such as monosilicic acid and polysilicic acids of low molecular weght, hydrous silica and colloidal silica. After impregnation with such solution, employed in a concentration and amount to provide the desired amount of barium and silicon, the catalyst base is dried, and then calcined at a temperature above that at which the compounds applied are decomposed to the oxides. Temperatures in excess of 800° F. but below that at which the catalyst is deleteriously affected, usually not in excess of about 1050° F., can be used.

The basic catalyst composition comprises bismuth oride and molybdenum oxide, the bismuth-to-molybdenum ratio Bi:Mo being controlled so that it is at all times above 1:3. There is no critical upper limit on the amount of bismuth, but in view of the relatively high cost of bismuth and the lack of an improved catalytic effect when large amounts are used, generally the atomic ratio bismuth to molybdenum Bi:Mo of about 3:1 is not exceeded. The nature of the chemical compounds which compose the basic catalyst is not known. The catalyst may be a mere mixture of bismuth and molybdenum oxides, with or without phosphorus oxide, but it seems more likely that the catalyst is a homogeneous micro mixture of loose chemical combinations of oxides of bismuth and molybdenum, with, optionally, phosphorus, and it is these combinations which appear to impart the desirable catalytic properties to this catalytic composition. The catalyst can be referred to as bismuth molybdate, or, when phosphorus is present, as bismuth phosphomolybdate, but this term is not to be construed as meaning that the catalyst is composed of these compounds.

The barium and silicon compounds added thereto as promoters may or may not enter into the chemical composition of the catalyst. Silicon added later with barium produces a different result from silicon added to a catalyst composition as a support and has a different function, since the enhanced catalytic effect is not obtained when silicon oxide is combined as a support. Hence, the promoted catalytic effect may be due to some complex silicon oxide-barium oxide combination formed on the surface of the catalyst. In any event, the silicon and barium are present in the form of their oxides, when combined therewith later in accordance with the invention.

The bismuth molybdate catalyst composition of the invention may have the following composition ranges, as long as the atomic ratio of bismuth to molybednum is above 1:3.

| Element: | Weight percent |
|---|---|
| Bismuth | 29.84–78.08 |
| Molybdenum | 11.32–47.29 |
| Oxygen | 9.96–26.84 |
| Phosphorus | 0–2.40 |

This same composition may be expressed in the form of the following empirical formula:

(1) $Bi_a P_b Mo_{12} O_c$ where $a$ is 4 to 36, $b$ is 0 to 2, and $c$ is $½n·a + ½m·b + ½p·12$ and where $n$, $m$ and $p$ are the average valences of bismuth, phosphorus, and molybdenum, respectively, in the oxidation states in which they exist in the catalyst as defined by the empirical formula above. Thus $n$ may range from 2 to 3, $m$ is about 5, and $p$ may range from 4 to 6, which collectively make $c$ range from 28 to 94.

When silica is used as the support, the empirical formula is (2) $Bi_a P_b Mo_{12} O_c · (SiO_2)_{1\ to\ 600}$ where $a$, $b$ and $c$ are as defined above.

When the silica is present as about 30 to 70 weight percent of the final composition, the empirical formula is (3) $Bi_a P_b Mo_{12} O_c · (SiO_2)_{30\ to\ 150}$ where $a$, $b$ and $c$ are as defined above.

To this are to be added barium oxide and silicon oxides, as such or as formed in situ from other added barium and silicon compounds, so that the empirical formula of the promoted catalyst in accordance with the invention corresponds to the following:

(4) 72.5–97% $(Bi_a P_b Mo_{12} O_c · (SiO_2)_{0-600})$ ·
1–6% $BaO · 2–21.5\%\ SiO_2$

The values of $a$, $b$ and $c$ are in accordance with the definitions given above.

When the atomic ratio of bismuth to molybdenum Bi:Mo is about 3:4, the empirical formula is (5) 72.5–97% $(Bi_9 P_b Mo_{12} O_c · (SiO_2)_{0-600})$ ·
1–6% $BaO · 2–21.5\%\ SiO_2$ The values of $b$ and $c$ are as defined above.

When the silica is present as about 30 to 70 weight percent of the final composition, the empirical formula is (6) 72.5–97% $(Bi_a P_b Mo_{12} O_c · (SiO_2)_{30-150})$ ·
1–6% $BaO · 2–21.5\%\ SiO_2$ where $a$, $b$ and $c$ are as defined above.

II. OXIDATION OF OLEFINS TO ALDEHYDES AND KETONES

The reactants

The reactants used in the oxidation to oxygenated compounds are an olefin or mixture thereof and oxygen.

By the term "olefin" as used herein and in the appended claims is meant the open-chain as well as cyclic olefins. Among the many olefinic compounds which may be utilized in accordance with the process of the invention, the following compounds are illustrative: propylene, butene-1, butene-2, isobutylene, pentene-1, pentene-2, 3-methyl-butene-1, 2-methyl-butene-2, hexene-1, hexene-2, 4-methylpentene-1, 3,3-dimethyl-butene-1, 4-methyl-pentene-2, octene-1, cyclopentene, cyclohexene, 3-methyl-cyclohexene, etc. This invention is directed particularly to the oxidation of the lower alkenes (3 to 8 carbon atoms) but higher alkenes may also be utilized with efficacy. These compounds and their various homologs and analogs may be substituted in the nucleus and/or in the substituents in various degrees by straight-chain alicyclic or heterocyclic radicals. The process of the invention is applicable to individual olefins as well as to mixtures of olefins and also to mixtures of olefins with the corresponding or other saturated organic compounds.

The process of this invention is particularly adapted to the conversion of propylene to acrolein, isobutylene to methacrolein, alpha- or beta-butylene to methyl vinyl ketone, pentene-1 or pentene-2 to ethyl vinyl ketone and/or pentene-3-one-2, 2-methyl-butene-2 to methyl isopropenyl ketone, cyclopentene to cyclopentenone-2, and the like.

Straight-chain alpha-olefins of three or more carbon atoms, when oxidized according to the process of the invention, tend to yield the same products as the corresponding beta-olefins. Thus, as stated above, the alpha-butylene, as well as beta-butylene, yields methyl vinyl ketone; and pentene-1, like pentene-2, yields ethyl vinyl ketone. It is believed that this results from isomerization of the alpha-olefins to the beta-olefins under the reaction conditions.

It is surprising that the vinyl type carbonylic products obtained by the process of this invention are not always those which would be expected from the direct substitition of an oxygen atom for two hydrogen atoms in the allyl position, i.e., for two hydrogen atoms attached to a carbon atom separated from the double bond by an intervening carbon atom. For in the latter case beta butylene would form crotonaldehyde and not methyl vinyl ketone. Instead, the reaction appears to be initiated at the double bond and proceeds with the elimination of a hydrogen atom in the allyl position and a change in position of the double bond.

The olefins may be in admixture with other hydrocarbons, for example, a propylene-propane mixture may constitute the feed. It is an advantage of our process that the propane is not readily oxidized and passes through the reaction largely as an inert diluent. This makes it possible to use ordinary refinery streams without special preparation.

Process conditions

The temperature at which this oxidation is conducted may vary considerably depending upon the catalyst, the particular olefin being oxidized and the correlated conditions of the rate of throughput or contact time and the ratio of olefin to oxygen. In general, when operating at pressures near atmospheric, i.e., 10 to 100 p.s.i.g., temperatures in the range of 500 to 1000° F. may be advantageously employed. However, the process may be conducted at other pressures, and in the case where super atmospheric pressures, e.g., above 100 p.s.i.g., are employed somewhat lower temperatures are feasible. In the case where this process is employed to convert propylene to acrolein, a temperature range of 750 to 850° F. has been found to be optimum at atmospheric pressure.

The apparent contact time employed in the process is not critical and it may be selected from a broad operable range which may vary from 0.1 to 50 seconds. The apparent contact time may be defined as the length of time in seconds which the unit volume of gas measured under the conditions of reaction is in contact with the apparent unit volume of the catalyst. It may be calculated for example from the apparent volume of the catalyst bed, the average temperature and pressure of the reactor, and the flow rates of the several components of the reaction mixture. The optimum contact time will, of course, vary depending upon the olefin being treated, but in the case of propylene the preferred apparent contact time is 1 to 15 seconds.

A molar ratio of oxygen to olefin between about 5:1 to 0.5:1 generally gives the most satisfactory results. For the conversion of propylene to acrolein, a preferred ratio of oxygen to olefin is about 1:1. The oxygen used in the process may be derived from any source: however, air appears to be the least expensive source of oxygen and it is preferred for that reason.

We have also discovered that the addition of water to the reaction mixture has a marked beneficial influence on the course of the reaction in that it improves the conversion and the yield of the desired product. The manner in which water affects the reaction is not fully understood but the theory of this phenomenon is not deemed important in view of the experimental results we have obtained. Accordingly, we prefer to include water in the reaction mixture. Generally, a ratio of olefin to water in the reaction mixture of 1:1 to 1:10 will give very satisfactory results and a ratio of 1:3 to 1:5 has been found to be optimum when converting propylene to acrolein. The water, of course, will be in the vapor phase during the reaction.

Inert diluents such as nitrogen, carbon dioxide, and saturated hydrocarbons such as ethane, propane, and butane and pentane may be present in the reaction mixture.

In general, any apparatus of the type suitable for carrying out oxidation reactions in the vapor phase may be employed for the execution of the process. It may be operated continuously or intermittently and may be a fixed bed with a pelleted catalyst or a so-called "fluidized" bed of catalyst. A "fluidized" catalyst bed simplifies problems of temperature control since coils through which water or other heat transfer medium is circulated may be conveniently disposed in the bed to control the temperature.

As stated above, pressures other than atmospheric may be employed in this process but it is generally preferred to operate at or near atmospheric pressure since the reaction proceeds well at such pressures and the use of expensive high pressure equipment is avoided.

The reactor may be brought to the reaction temperature before or after the introduction of the vapors to be reacted. In large scale operation, it is preferred to carry out the process in a continuous manner and in this system the recirculation of unreacted olefin and/or oxygen is contemplated. Periodic regeneration or reactivation of the catalyst is also contemplated. This may be accomplished, for example, by contacting the catalyst with air at an elevated temperature.

The unsaturated carbonyl product or products may be isolated from the gases leaving the reaction zone by any appropriate means, the exact procedure in any given case being determined by the nature and quantity of the reaction products. For example, the excess gas may be scrubbed with cold water or an appropriate solvent to remove the carbonyl product. In the case where the products are recovered in this manner, the ultimate recovery from the solvent may be by any suitable means such as distillation. The efficiency of the scrubbing operation may be improved when water is employed as the scrubbing agent by adding a suitable wetting agent to the water. If desired, the scrubbing of the reaction gases may be preceded by a cold water quench of the gases which of itself will serve to separate a significant amount of the carbonyl products. Where molecular oxygen is employed as the oxidizing agent in this process, the resulting product mixture remaining after the removal of the carbonyl product may be treated to remove carbon dioxide with the remainder of the mixture comprising any unreacted olefin and oxygen being recycled through the reactor. In the case where air is employed as the oxidizing agent in lieu of molecular oxygen, the residual product after separation of the carbonyl product may be scrubbed with a non-polar solvent e.g., a hydrocarbon fraction, in order to recover unreacted olefin and in this case the remaining gases may be discarded. An inhibitor to prevent polymerization of the unsaturated products, as is well known in the art, may be added at any stage.

The following examples, in the opinion of the inventors, represent preferred embodiments of their invention:

*Example I*

A bismuth silicophosphomolybdate catalyst base was prepared by the following procedure:

74 g. of an 85% phosphoric acid was added to 8330 g. of an aqueous silica sol containing 30% silica. Next, 2800 g. of bismuth nitrate was dissolved in a solution made by diluting 160 ml. of 70% nitric acid to 1540 ml. with distilled water. The bismuth nitrate solution was then added to the silica sol. Next, 1360 g. of ammonium molybdate was dissolved in 1540 ml. of distilled water, and this solution added to the silica sol. The resulting catalyst slurry was dried in an oven at 200° F. for 24 hours and then calcined in a furnace at 800° F. for 24 hours. After cooling, the catalyst was ground into particles, and screened through a 10 mesh screen. A portion of the 8–10 mesh material was then made into tablets.

The final catalyst composition corresponded to the empirical formula $Bi_9PMo_{12}O_{52} \cdot (SiO_2)_{65}$, having the following composition:

| Element: | Weight percent |
|---|---|
| Bismuth | 24.2 |
| Phosphorus | 0.4 |
| Molybdenum | 14.8 |
| Silicon | 23.4 |
| Oxygen | 37.2 |

This tabletted catalyst was then impregnated with promoters in accordance with the invention, by the following procedure:

25.9 g. of barium acetate was dissolved in hot water and diluted up to 420 ml. This hot solution was used to impregnate 400 g. of the tabletted catalyst prepared as described above, dipping tablets of the catalyst contained in a wire basket in the solution for 4 minutes, then removing and draining them for 4 minutes. By this procedure, 120 ml. of the barium acetate solution was absorbed by the catalyst, equivalent to 4.4 g. BaO. The wet catalyst was dried overnight.

The barium acetate-impregnated catalyst was impregnated a second time by the above method using a solution prepared by diluting 206 g. of 30% fluosilicic acid solution to 420 cc. with water.

The impregnated catalyst was dried at 120° C. overnight.

The twice-impregnated catalyst of the invention then was calcined in air for 12 hours at 800° F. Finally, the catalyst was ground and screened, to obtain a size fraction in the 8 to 10 mesh range.

Thus, the catalyst of the invention contained 1% added barium and 1% added silicon, together.

The barium and silicon promoted catalyst was employed in fixed bed form for the conversion of propylene to acrolein. During the reaction the reactor was maintained at a temperature of 825° F. at atmospheric pressure. The contact time with the catalyst was approximately one second. The feed molar ratios were air/$H_2O$/ propylene/nitrogen, 5/6/1/32. Approximately 56% of the propylene feed was converted to acrolein and about 31% of the propylene was unreacted. This unreacted material could be recycled. The remainder of the product consisted of carbon oxides, minor amounts of low molecular weight carbonylic compounds, and organic acids.

*Example II*

The bismuth silicophosphomolybdate catalyst of Example I was employed to prepare another promoted catalyst corresponding to that of Example I but with a greater amount of barium. The catalyst of the invention contained 3% added barium and 1% added silicon, as the oxides.

The catalyst of the invention containing 3% added barium and 1% added silicon was used in the conversion of propylene to acrolein in a fixed bed. During the reaction, the reactor was maintained at a temperature of 850° F. at 6 p.s.i.g. The apparent contact time with the catalyst was approximately 2.8 seconds. The feed molar ratios were propylene/air/$H_2O$/nitrogen, 1/11/2/12. Approximately 53% of the propylene feed was converted to acrolein. The total conversion was 79.7% of the propylene feed, the remainder consisting of 0.5% acetaldehyde, 2.9% acrylic acid, 1.3% acetic acid, and carbon oxides.

All percentages in the specification and claims are by weight, in the case of the catalyst composition, and by volume in the case of gases.

We claim:

1. A process for the manufacture of unsaturated aldehydes from olefins, which comprises the step of contacting in the vapor phase at a temperature within the range from about 500 to about 1000° F. at which aldehyde formation proceeds, a mixture of the olefin and oxygen in a molar ratio oxygen to olefin within the range from about 5:1 to about 0.5:1 with a catalyst consisting essentially of oxides of bismuth and molybdenum as the essential catalytic ingredients, the bismuth oxide being present in an amount to furnish a bismuth to molybdenum Bi:Mo atomic ratio of above 1:3, promoted by a mixture of oxides of barium and silicon, in the proportion of about 1 to about 5%, calculated as barium, and about 1 to about 10%, calculated as silicon.

2. A process in accordance with claim 1, in which the olefin is propylene.

3. The process in accordance with claim 1, in which the catalyst also includes phosphorus in an amount up to about 5% by weight.

4. The process in accordance with claim 1, in which the catalyst has a composition corresponding to the empirical chemical formula:

72.5–97% $(Bi_aP_bMo_{12}O_c)\cdot$1–6% $BaO\cdot$2–21.5% $SiO_2$ where $a$ is a number within the range from about 4 to 36, $b$ a number within the range from 0 to 2, and $c$ is $\frac{1}{2}n\cdot a + \frac{1}{2}m\cdot b + \frac{1}{2}p\cdot 12$, wherein $n$, $m$ and $p$ are the average valences of bismuth, phosphorus and molybdenum, respectively, in the catalyst.

5. The process in accordance with claim 1, in which the catalyst is supported on silica.

6. The process for the manufacture of unsaturated aldehydes from olefins, which comprises contacting in the vapor phase at a temperature within the range from about 500° to about 1000° F., a mixture of an olefin having from three to eight carbon atoms, and oxygen in a molar ratio oxygen to olefin between about 5:1 to 0.5:1 with a catalyst consisting essentially of oxides of bismuth and molybdenum as the essential catalytic ingredients, the bismuth oxide being present in an amount to furnish a bismuth to molybdenum Bi:Mo atomic ratio of above 1:3, promoted by a mixture of oxides of barium and silicon, in the proportion of about 1 to about 5%, calculated as barium, and about 1 to about 10%, calculated as silicon.

7. A process in accordance with claim 6, in which the olefin is propylene.

No references cited.

LEON ZITVER, *Primary Examiner.*

R. H. LILES, *Assistant Examiner.*